United States Patent
Bang et al.

(10) Patent No.: US 11,028,813 B2
(45) Date of Patent: Jun. 8, 2021

(54) METHOD FOR CONTROLLING A VEHICLE INCLUDING AN IDLE STOP AND GO FUNCTION

(71) Applicants: HYUNDAI MOTOR COMPANY, Seoul (KR); KIA MOTORS CORPORATION, Seoul (KR)

(72) Inventors: Jung Hwan Bang, Hwaseong-si (KR); Young Ho Jung, Seoul (KR); Tae Suk Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 49 days.

(21) Appl. No.: 16/009,997

(22) Filed: Jun. 15, 2018

(65) Prior Publication Data
US 2019/0186451 A1 Jun. 20, 2019

(30) Foreign Application Priority Data
Dec. 18, 2017 (KR) .......................... 10-2017-0174090

(51) Int. Cl.
*F02N 11/08* (2006.01)
*F02D 41/04* (2006.01)

(52) U.S. Cl.
CPC ........ *F02N 11/0833* (2013.01); *F02D 41/042* (2013.01); *F02N 11/0822* (2013.01); *F02N 2200/022* (2013.01); *F02N 2200/0801* (2013.01); *F02N 2200/0802* (2013.01); *F02N 2200/102* (2013.01); *F02N 2200/103* (2013.01)

(58) Field of Classification Search
CPC ......... F02N 11/0833; F02N 2200/0802; F02N 2200/102; F02N 2200/103; F02N 2200/022; F02N 2200/0801; F02D 41/042
USPC .......................................................... 701/112
See application file for complete search history.

(56) References Cited

U.S. PATENT DOCUMENTS

| | | | | |
|---|---|---|---|---|
| 6,183,389 B1 * | 2/2001 | Tabata | ................. | B60W 10/10 477/5 |
| 6,317,665 B1 * | 11/2001 | Tabata | ................. | B60W 10/02 701/22 |
| 6,334,499 B1 * | 1/2002 | Matsubara | ............ | B60W 20/10 180/65.26 |
| 6,358,180 B1 * | 3/2002 | Kuroda | ................. | B60K 6/543 477/4 |

(Continued)

*Primary Examiner* — Logan M Kraft
*Assistant Examiner* — John D Bailey
(74) *Attorney, Agent, or Firm* — Lempia Summerfield Katz LLC

(57) ABSTRACT

A method for controlling a vehicle includes: receiving a detection signal required to perform an idle stop and go (ISG) function; and controlling the vehicle to enter into an ISG state where a fuel supply to an engine is cut off and the engine stops when the vehicle decelerates or stops in response to the detection signal. The detection signal includes a fuel cut off signal in on state when the vehicle decelerates and in off state at a reference revolution number of the engine, a gear engagement signal, a clutch pedal signal indicating whether a clutch pedal operating a clutch is operated, and a brake pedal signal indicating whether a brake pedal is operated. A controller generates an ISG entry signal based on the fuel cut off signal, the gear engagement signal, the clutch pedal signal, and the brake pedal signal to enter the vehicle into the ISG state.

4 Claims, 3 Drawing Sheets

(56) References Cited

U.S. PATENT DOCUMENTS

| | | | | |
|---|---|---|---|---|
| 6,371,889 B1* | 4/2002 | Kuroda | B60K 6/485 | 477/181 |
| 6,422,972 B1* | 7/2002 | Eguchi | B60K 6/543 | 477/107 |
| 6,504,259 B1* | 1/2003 | Kuroda | B60L 58/20 | 290/400 |
| 6,752,112 B1* | 6/2004 | Ohata | H02K 7/006 | 123/179.4 |
| 8,360,182 B2* | 1/2013 | Schneider | B60W 30/18136 | 180/65.28 |
| 2002/0074173 A1* | 6/2002 | Morimoto | B60W 10/06 | 180/65.26 |
| 2002/0103055 A1* | 8/2002 | Tani | B60W 10/18 | 477/115 |
| 2008/0176705 A1* | 7/2008 | Tamai | B60W 10/026 | 477/3 |
| 2011/0029221 A1* | 2/2011 | Minamitani | F02N 11/0822 | 701/112 |
| 2011/0146609 A1* | 6/2011 | Enoki | F16H 61/143 | 123/179.3 |
| 2012/0247414 A1* | 10/2012 | Crisp | B60W 10/30 | 123/179.4 |
| 2012/0290194 A1* | 11/2012 | Shoda | F02N 11/08 | 701/104 |
| 2012/0330522 A1* | 12/2012 | Gibson | B60W 30/18018 | 701/70 |
| 2013/0005532 A1* | 1/2013 | Gibson | F16H 61/16 | 477/115 |
| 2013/0211653 A1* | 8/2013 | Matsui | B60K 6/48 | 701/22 |
| 2014/0372013 A1* | 12/2014 | Shimizu | F02N 11/108 | 701/112 |
| 2015/0258984 A1* | 9/2015 | Atluri | B60K 6/485 | 701/22 |
| 2015/0322912 A1* | 11/2015 | Takizawa | F02N 11/0822 | 701/65 |
| 2015/0361910 A1* | 12/2015 | Ko | F02N 11/0833 | 477/107 |
| 2016/0137261 A1* | 5/2016 | Ohashi | B62K 23/06 | 701/67 |
| 2018/0215386 A1* | 8/2018 | Naserian | G08G 1/096783 | |

* cited by examiner

METHOD FOR CONTROLLING A VEHICLE INCLUDING AN IDLE STOP AND GO FUNCTION

CROSS-REFERENCE TO RELATED APPLICATION

This application claims priority to and the benefit of Korean Patent Application No. 10-2017-0174090 filed in the Korean Intellectual Property Office on Dec. 18, 2017, the entire contents of which are incorporated herein by reference.

BACKGROUND

(a) Field of the Disclosure

The present disclosure relates to a method for controlling a vehicle, and more particularly, to a method for controlling a vehicle including an idle stop and go function.

(b) Description of the Related Art

Efforts have been made worldwide to reduce carbon dioxide generated by combustion of a fuel in vehicles and to improve fuel efficiency of vehicles in accordance with an era of high oil prices.

An idle stop and go (ISG) system has been developed to meet these goals. It has been proven that the ISG system can reduce an amount of carbon dioxide generated in the vehicle and can improve fuel efficiency.

The ISG system is an engine control system that stops or turns off an engine of a vehicle to prevent the engine from operating when the vehicle decelerates or stops. The ISG system drives the engine again to enable the vehicle to move when the vehicle starts.

The ISG system uses information such as the vehicle speed, the engine speed, and the engine coolant temperature to stop the engine when the engine is idling. In other words, the ISG system automatically stops the idling engine when the vehicle decelerates or stops, such as at a traffic signal, and restarts the engine to start the vehicle after a predetermined time. The ISG system may also be expressed as an idling stop control device. The ISG system can improve fuel economy by about 5 to 15% in a fuel economy mode. A vehicle equipped with the ISG system is referred to as an ISG vehicle.

Because the ISG system prevents the engine from operating when the vehicle decelerates or stops, fuel is not used. Thus, the fuel efficiency of the vehicle can be improved and carbon dioxide is not discharged.

The ISG system may include a method of starting the engine using an electric motor and may include a method of starting the engine using a hydraulic motor. A passenger car can use the method of starting the engine using the electric motor.

The above information disclosed in this Background section is only to enhance understanding of the background of the disclosure. Therefore, the Background section may contain information that is not prior art that is already known in this country to a person of ordinary skill in the art.

SUMMARY

The present disclosure is made in an effort to provide a method for controlling a vehicle including an idle stop and go function. The method is capable of maintaining a fuel cut off state until the vehicle stops after cutting off a fuel supply to an engine when the vehicle decelerates.

An embodiment of the present disclosure may provide the method for controlling a vehicle including the idle stop and go function. The method may include: receiving, by a controller, a detection signal required to perform the idle stop and go function; and controlling, by the controller, the vehicle to enter into an idle stop and go state where a fuel supply to an engine of the vehicle is cut off and the engine stops when the vehicle decelerates or stops according to the idle stop and go function, in response to the detection signal. The detection signal may include a fuel cut off signal that is in an on state when the vehicle decelerates, is in an off state at a reference revolution number of the engine, and indicates whether a fuel supply to the engine is cut off, a gear engagement signal indicating whether a gear included in a transmission of the vehicle is engaged, a clutch pedal signal indicating whether a clutch pedal operating a clutch of the vehicle is operated, and a brake pedal signal indicating whether a brake pedal of the vehicle is operated. The controller may be configured to generate an idle stop and go entry signal based on the fuel cut off signal that is in a state before transitioning from an on state to an off state, the gear engagement signal that is in an on state, the clutch pedal signal that is in an off state, and the brake pedal signal that is in an on state. The controller may be configured to enter the vehicle into the idle stop and go state based on the idle stop and go entry signal.

The reference revolution number of the engine may be greater than an idle revolutions per minute of the engine and may have a value close to the idle revolutions per minute.

The gear of the transmission may be in an engagement state and the clutch pedal signal may be in an off state when the fuel cut off signal is in an on state.

The method for controlling the vehicle including the idle stop and go function may further include determining, by the controller, whether the gear of the transmission is switched from a neutral state to a gear engagement state after the clutch pedal signal is switched to an on state. The controller may be configured to release the idle stop and go state when the gear of the transmission is switched from the neutral state to the gear engagement state.

The method for controlling the vehicle may further include determining, by the controller, whether the brake pedal signal is switched to an off state when the gear of the transmission is not switched from the neutral state to the gear engagement state. The controller may be configured to release the idle stop and go state when the brake pedal signal is switched to the off state.

The transmission may include a manual transmission.

The method for controlling the vehicle including the idle stop and go function, according to an embodiment of the present disclosure, may prevent fuel injection from being applied in the engine even when the clutch pedal is depressed in a state where the gear of the transmission is engaged after fuel cut off by deceleration of the vehicle. Thus, fuel efficiency or fuel economy of the vehicle may be improved.

BRIEF DESCRIPTION OF THE DRAWINGS

A brief description of the drawings is provided to more sufficiently understand the drawings, which are referenced in the detailed description of the present disclosure.

Figure 1:
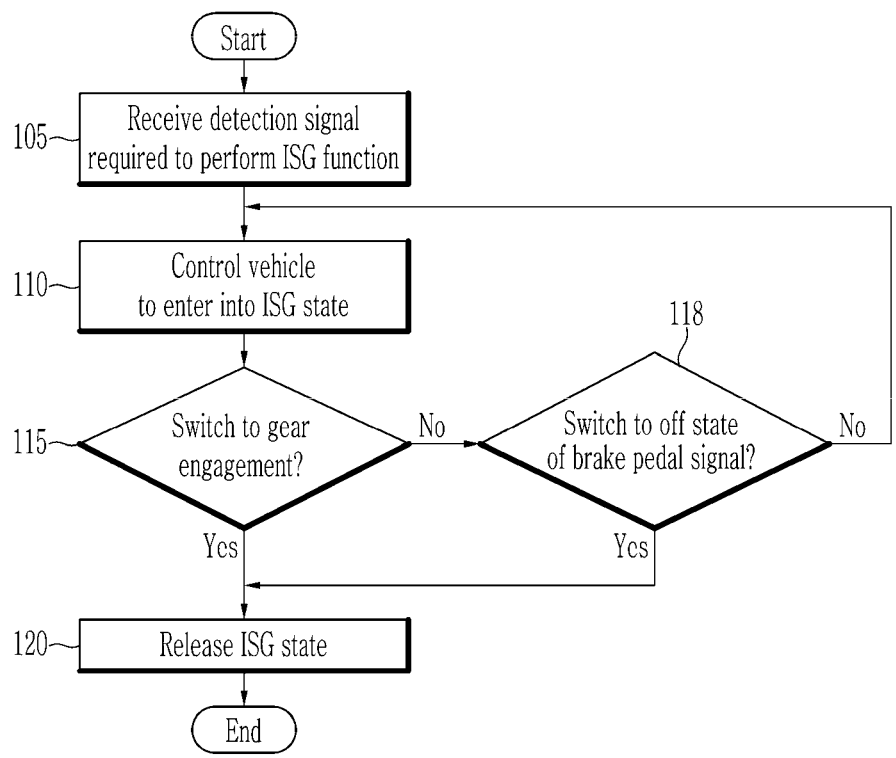
FIG. 1 is a flowchart illustrating a method for controlling a vehicle including an idle stop and go (ISG) function according to an embodiment of the present disclosure.

The following reference characters are used throughout the drawings and specification:
20: transmission
32: belt
30: mild-hybrid starter-generator
40: battery (48V)
50: differential gear device
60: wheels
200: controller
205: engine

DETAILED DESCRIPTION OF THE EMBODIMENTS

In order to better understand the present disclosure and the object achieved by the embodiments of the present disclosure, the accompanying drawings illustrating embodiments of the present disclosure and contents described in the accompanying drawings are to be referenced.

Hereinafter, the present disclosure is described in detail by describing embodiments of the present disclosure with reference to the accompanying drawings. In describing the present disclosure, well-known configurations or functions are not described in detail since they may unnecessarily obscure the gist of the present disclosure. Throughout the accompanying drawings, the same reference numerals are used to denote the same components.

Terms used in the present specification are only used in order to describe specific embodiments rather than to limit the present disclosure. Singular forms are to include plural forms unless the context clearly indicates otherwise. It should be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification, including technical and scientific terms, have the same meanings as those that are generally understood by those having ordinary skill in the art. It should be understood that the terms defined by the dictionary are identical with the meanings within the context of the related art. Such terms should not be ideally or excessively formally defined unless the context clearly dictates otherwise.

According to a related art, when a clutch pedal is depressed in a state where a gear of a transmission is engaged during deceleration of a vehicle, the vehicle may not enter into an idle stop and go (ISG) state.

Figure 2:
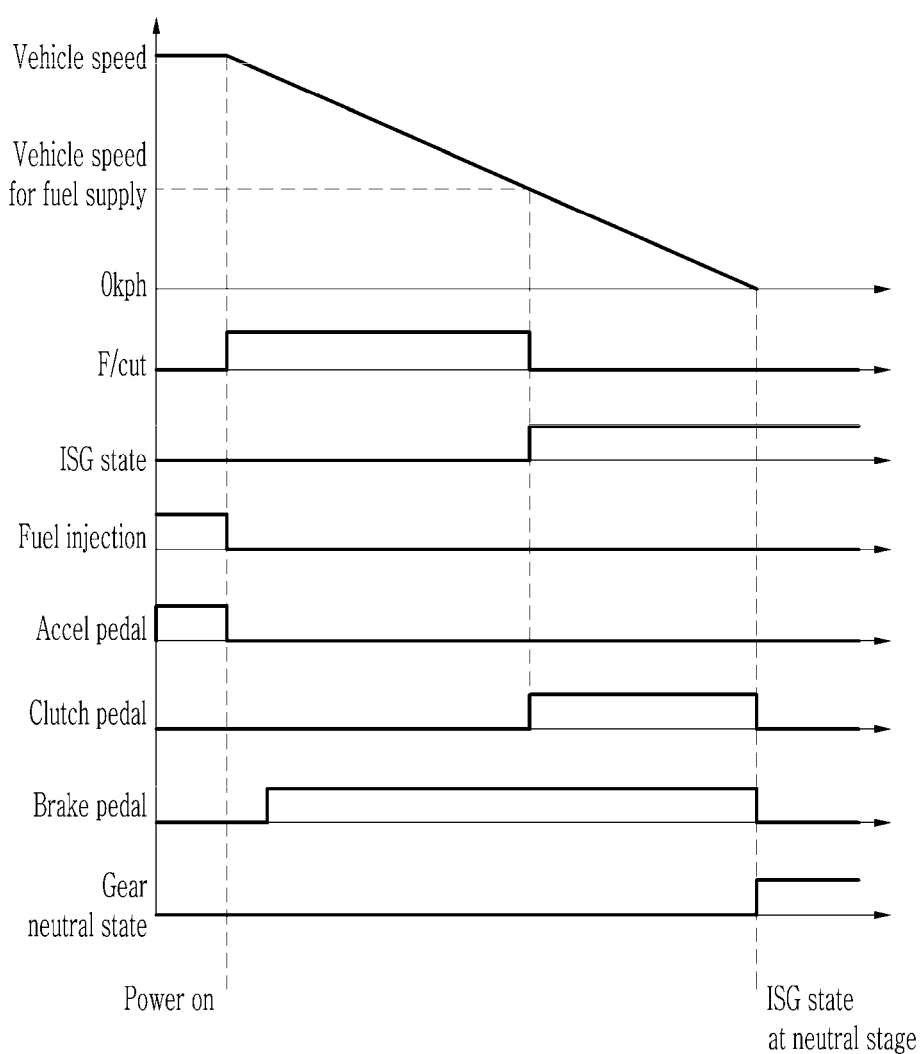
FIG. 2 is a view explaining the method for controlling the vehicle including the ISG function shown in FIG. 1 according to time.
Figure 3:
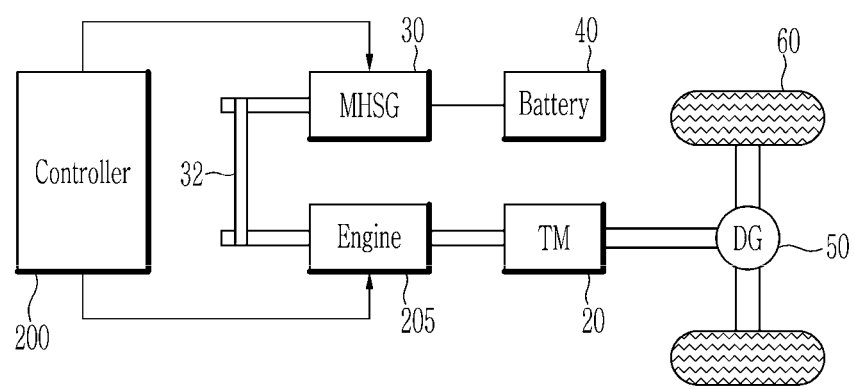
FIG. 3 is a block diagram illustrating an example of a vehicle to which the method for controlling the vehicle including the ISG function shown in FIG. 1 is applied.

FIG. 1 is a flowchart illustrating a method for controlling a vehicle including an ISG function according to an embodiment of the present disclosure. FIG. 2 is a view explaining the method for controlling the vehicle including the ISG function shown in FIG. 1 according to time. FIG. 3 is a block diagram illustrating an example of a vehicle to which the method for controlling the vehicle including the ISG function shown in FIG. 1 is applied.

Referring to FIGS. 1-3, in a reception step 105, a controller 200 may receive a detection signal necessary for performing the ISG function. The ISG function may mean a function that stops an engine 205 of the vehicle to prevent the engine from operating when the vehicle decelerates or stops and a function that drives the engine again to enable the vehicle to move when the vehicle starts. More specifically, the ISG function may be a function that automatically stops the engine 205 by preventing fuel injection from being applied in the engine when the vehicle decelerates or stops while the vehicle is running. The ISG function may also be a function that automatically restarts the engine by a starter-generator 30 when the vehicle restarts in the decelerated or stopped state (e.g., when the driver of the vehicle releases a brake pedal and depresses an acceleration pedal).

The detection signal may include a fuel cut off signal that is in an on state when the vehicle is decelerated, is in an off state when a revolution number (or a revolution speed) of the engine 205 becomes a reference revolution number of the engine, and indicates whether a fuel supply to the engine is cut off. The detection signal may include a gear engagement signal indicating whether a gear included in a transmission 20 of the vehicle is engaged. The detection signal may include a clutch pedal signal indicating whether a clutch pedal operating a clutch of the vehicle is operated. The detection signal may include a brake pedal signal indicating whether the brake pedal of the vehicle is operated. The reference revolution number of the engine 205 may be greater than an idle revolutions per minute (RPM) of the engine, i.e.' the engine RPM at idle, and may have a value (e.g., 1000 RPM) that is close to the idle RPM for maintaining the idle RPM and preventing the engine from turning off. The gear of the transmission 20 may be in an engagement state and the clutch pedal signal may be in an off state when the fuel cut off signal is in an on state. The clutch may be installed between the engine 205 and the transmission 20 to transmit or interrupt a power of the engine to the transmission.

The fuel cut off signal may be a signal used for improving fuel efficiency of the vehicle, maintaining the idle RPM of the engine 205, and preventing a start of the engine from being turned off when the vehicle decelerates. The fuel cut off signal may be generated by the controller 200 when the acceleration pedal of the vehicle is in an off state and the brake pedal is in an off state or the brake pedal is in an on state. When the fuel cut off signal is in an on state, an RPM of the engine 205 may be equal to or greater than a certain value (e.g., 1500 rpm or 2000 rpm).

The reference revolution number of the engine 205 may be detected by a RPM sensor of the vehicle and the detected number may be provided to the controller 200. The gear engagement signal may be detected by a sensor that senses gear engagement of the transmission installed in the vehicle and the detected signal may be provided to the controller 200. The clutch pedal signal may be detected by a clutch pedal sensor (CPS) of the vehicle and the detected signal may be provided to the controller 200. The brake pedal signal may be detected by a brake pedal sensor (BPS) of the vehicle and the detected signal may be provided to the controller 200. A state of the acceleration pedal may be detected by an acceleration pedal position sensor (APS) of the vehicle and the detected signal may be provided to the controller 200.

The controller 200 may control an overall operation of the vehicle. For example, the controller 200 such as an engine control unit (ECU) may be one or more microprocessors operated by a program or hardware including the microprocessor. The program may include a series of commands for executing the method for controlling the vehicle including the ISG function according to the embodiment of the present disclosure. The commands may be stored in a memory.

The vehicle may be, for example, a mild hybrid vehicle as depicted in FIG. 3, and may include the engine 205, the transmission 20 such as a manual transmission, the starter-generator (or the mild hybrid starter and generator) 30, a battery 40, a differential gear device 50, wheels 60, and the controller 200. The embodiment of the present disclosure may be applied to a vehicle other than the mild hybrid vehicle shown in FIG. 3.

The engine 205 may convert chemical energy to mechanical energy by burning fuel and air. Torque of the engine 205 may be transmitted to an input shaft of the transmission 20, and torque output from an output shaft of the transmission may be transmitted to an axle of the vehicle via the differential gear device 50. The axle may rotate the wheels 60 so that the mild hybrid vehicle may be driven.

The starter-generator 30 may convert electrical energy to mechanical energy or mechanical energy to electrical energy. In other words, the starter-generator 30 may start the engine 205 or generate electricity according to an output of the engine 205. In addition, the starter-generator 30 may assist the torque of the engine 205. The mild hybrid vehicle may use the torque of the starter-generator 30 as an auxiliary power source while combustion torque of the engine 205 is a main power source. The engine 205 and the starter-generator 30 may be connected via the belt 32 (or a pulley and a belt).

In the mild hybrid vehicle, the starter-generator 30 may be a part performing functions of an alternator, the engine torque assist, or regenerative braking.

The starter-generator 30 may drive the engine 205 of the vehicle in a cranking and torque control mode of the vehicle (or the engine) and may generate electricity according to an output of the engine to charge the 48V battery 40 in an electricity generation mode of the vehicle. The starter-generator 30 may operate in an operating mode in accordance with a driving state of the vehicle. The operating mode may include an engine starting mode, an engine torque assist mode for assisting torque of the engine by operating as a motor, a mode for charging the 48V battery 40 and for charging the 12V battery that is connected to the 48V battery 40 via the low voltage DC-DC converter (LDC), a regenerative braking mode for charging the 48V battery 40, or an inertial driving mode for extending a mileage of the vehicle. The starter-generator 30 may be optimally controlled according to the driving state of the vehicle to increase fuel efficiency of the vehicle.

The battery 40 may supply electricity to the starter-generator 30 or may be charged by electricity collected through the starter-generator 30 in a regenerative braking mode of the vehicle. The battery 40 may be a 48V battery. The mild hybrid vehicle may further include a LDC that converts voltage supplied from the battery 40 to a low voltage and a 12V battery that supplies the low voltage to an electric load of the vehicle.

According to a step 110, in response to the detection signal, the controller 200 may control the vehicle to enter into an ISG state where a fuel supply to the engine 205 of the vehicle is cut off and the engine stops when the vehicle decelerates or stops according to the ISG function of the controller. As shown in FIG. 2, the controller 200 may generate an ISG entry signal based on the fuel cut off signal F/cut that is in a state before transitioning from an on state to an off state, the gear engagement signal that is in an on state, the clutch pedal signal that is in an off state, and the brake pedal signal that is in an on state. The controller 200 may enter the vehicle into the ISG state based on the ISG entry signal. An RPM of the engine 205 corresponding to the ISG entry signal may be greater than the reference revolution number of the engine and may be, for example, 1050 RPM. The clutch may be engaged when the clutch pedal signal is in an off state and the clutch may be disengaged when the clutch pedal signal is in an on state. The ISG entry signal may be a signal that shuts down the engine 205 when the vehicle does not require acceleration.

The vehicle may perform a coasting drive, i.e., may coast, when the fuel cut off signal F/cut is in an on state, the gear engagement signal is in an on state, the clutch pedal signal is in an off state, and the brake pedal signal is in an on state. An acceleration pedal signal indicating whether the acceleration pedal of the vehicle is operated may be in an off state before the coasting drive of the vehicle. The acceleration pedal signal may be detected by the APS of the vehicle and the detected signal may be provided to the controller 200.

The vehicle speed (or the vehicle speed for fuel supply) corresponding to the reference revolution number of the engine 205 may be, for example, 50 KPH (31 MPH). The gear included in the transmission 20 may be in a neutral state when the gear engagement signal is in an off state.

According to a determination step 115, the controller 200 may determine whether the gear of the transmission 20 is switched from a neutral state to a gear engagement state after the clutch pedal signal is switched to an on state. For example, in the case of being switched to the gear engagement state, the driver of the vehicle may decelerate the vehicle using a fifth gear and then may depress the clutch pedal to sequentially switch the gear to a neutral state and a third gear in a situation where the driver still presses the brake pedal.

According to a release step 120, the controller 200 may release the ISG state when the gear of the transmission 20 is switched from the neutral state to the gear engagement state in the determination step 115. As a result, the engine 205 may be restarted.

According to a determination step 118, when it is determined in the determination step 115 that the gear of the transmission 20 is not switched from the neutral state to the gear engagement state, the controller 200 may determine whether the brake pedal signal is switched to an off state. When the brake pedal signal is switched to the off state, the method for controlling the vehicle including the ISG function may proceed to the release step 120 so that the controller 200 may release the ISG state.

The components, "~unit", block, or module which are used in the present embodiment may be implemented in software such as a task, a class, a subroutine, a process, an object, an execution thread, or a program, which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, embodiments have been disclosed in the accompanying drawings and the specification. Herein, specific terms have been used. However, the specific terms are used only for the purpose of describing aspects of the present disclosure and are not used for qualifying the meaning or limiting the scope of the present disclosure, which is disclosed in the appended claims. Therefore, it will be understood by those having ordinary skill in the art that various modifications and equivalent embodiments are possible from the present disclosure. Accordingly, the actual technical protection scope of the present disclosure must be determined by the spirit of the appended claims.

What is claimed is:

1. A method for controlling a vehicle including an idle stop function during operation of the vehicle, the method comprising:
    receiving, by a controller, a detection signal required to perform the idle stop function; and
    controlling, by the controller, in response to the detection signal, the vehicle to enter into an idle stop state, wherein a fuel supply to an engine of the vehicle is cut off and the engine stops when the vehicle decelerates or stops according to the idle stop function,
    wherein the detection signal includes (a) a fuel cut off signal that is in an on state when the vehicle decelerates, is in an off state at a reference revolution number of the engine, and indicates whether a fuel supply to the engine is cut off, (b) a gear engagement signal indicating whether a gear included in a transmission of the vehicle is engaged, (c) a clutch pedal signal indicating whether a clutch pedal operating a clutch of the vehicle is operated, and (d) a brake pedal signal indicating whether a brake pedal of the vehicle is operated,
    wherein the controller is configured to generate an idle stop entry signal based on (i) the fuel cut off signal that is in an on state, (ii) the gear engagement signal that is in an on state, (iii) the clutch pedal signal that is in an off state, and (iv) the brake pedal signal that is in an on state, and wherein the controller is configured to enter the vehicle into the idle stop and go state based on the idle stop and go entry signal,
    wherein the reference revolution number of the engine is greater than an idle revolutions per minute of the engine and has a value close to the idle revolutions per minute, and
    wherein the gear of the transmission is in an engagement state and the clutch pedal signal is in an off state when the fuel cut off signal is in an on state while the vehicle is in the idle stop state during the operation of the vehicle.

2. The method of claim 1, further comprising:
    determining, by the controller, whether the gear of the transmission is switched from a neutral state to a gear engagement state after the clutch pedal signal is switched to an on state, and
    wherein the controller is configured to release the idle stop state when the gear of the transmission is switched from the neutral state to the gear engagement state.

3. The method of claim 2, further comprising:
    determining, by the controller, whether the brake pedal signal is switched to an off state when the gear of the transmission is not switched from the neutral state to the gear engagement state, and
    wherein the controller is configured to release the idle stop state when the brake pedal signal is switched to the off state.

4. The method of claim 1, wherein the transmission includes a manual transmission.

\* \* \* \* \*